US011403336B2

(12) United States Patent
Raichelgauz et al.

(10) Patent No.: US 11,403,336 B2
(45) Date of Patent: Aug. 2, 2022

(54) SYSTEM AND METHOD FOR REMOVING CONTEXTUALLY IDENTICAL MULTIMEDIA CONTENT ELEMENTS

(71) Applicant: Cortica, Ltd., Tel Aviv (IL)

(72) Inventors: Igal Raichelgauz, Tel Aviv (IL); Karina Odinaev, Tel Aviv (IL); Yehoshua Y. Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 300 days.

(21) Appl. No.: 15/296,551

(22) Filed: Oct. 18, 2016

(65) Prior Publication Data
US 2017/0046343 A1    Feb. 16, 2017

Related U.S. Application Data

(63) Continuation-in-part of application No. 14/643,694, filed on Mar. 10, 2015, now Pat. No. 9,672,217, (Continued)

(51) Int. Cl.
| | | |
|---|---|---|
| G06F 16/48 | (2019.01) | |
| G06F 16/174 | (2019.01) | |
| G06F 16/41 | (2019.01) | |

(52) U.S. Cl.
CPC .......... *G06F 16/48* (2019.01); *G06F 16/1748* (2019.01); *G06F 16/41* (2019.01);
(Continued)

(58) Field of Classification Search
None
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |

(Continued)

FOREIGN PATENT DOCUMENTS

| | | |
|---|---|---|
| EP | 1085464 A3 | 1/2007 |
| WO | 0231764 | 4/2002 |

(Continued)

OTHER PUBLICATIONS

Bilyana Taneva et al. "Gathering and Ranking Photos of Named Entities with High Precision, High Recall, and Diversity", WSDM '10, Feb. 4-6, 2010, New York City, New York USA ACM 2010, 10 pages.*

(Continued)

*Primary Examiner* — Uyen T Le
(74) *Attorney, Agent, or Firm* — Reches Patents

(57) ABSTRACT

A system and method for removing contextually identical multimedia content elements. The method includes analyzing a plurality of multimedia content elements to identify at least two multimedia content elements of the plurality of multimedia content elements that are contextually identical; selecting, from among the at least two contextually identical multimedia content elements, at least one optimal multimedia content element; and removing, from a storage, all multimedia content elements of the group of contextually identical multimedia content elements other than the at least one optimal multimedia content element.

26 Claims, 6 Drawing Sheets

Related U.S. Application Data which is a continuation of application No. 13/766,463, filed on Feb. 13, 2013, now Pat. No. 9,031,999.

(60) Provisional application No. 62/310,742, filed on Mar. 20, 2016.

(52) U.S. Cl.
CPC ............... Y10S 707/99943 (2013.01); Y10S 707/99948 (2013.01)

(56) References Cited

U.S. PATENT DOCUMENTS

| | | | |
|---|---|---|---|
| 4,972,363 A | 11/1990 | Nguyen et al. | |
| 5,214,746 A | 5/1993 | Fogel et al. | |
| 5,307,451 A | 4/1994 | Clark | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador et al. | |
| 5,745,678 A | 4/1998 | Herzberg et al. | |
| 5,763,069 A | 6/1998 | Jordan | |
| 5,806,061 A | 9/1998 | Chaudhuri et al. | |
| 5,835,901 A | 11/1998 | Duvoisin et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,940,821 A | 8/1999 | Wical | |
| 5,978,754 A | 11/1999 | Kumano | |
| 5,987,454 A | 11/1999 | Hobbs | |
| 5,991,306 A | 11/1999 | Burns et al. | |
| 6,038,560 A | 3/2000 | Wical | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A | 12/2000 | Lee et al. | |
| 6,240,423 B1 | 5/2001 | Hirata | |
| 6,243,375 B1 | 6/2001 | Speicher | |
| 6,243,713 B1 | 6/2001 | Nelson et al. | |
| 6,275,599 B1 | 8/2001 | Adler et al. | |
| 6,329,986 B1 | 12/2001 | Cheng | |
| 6,363,373 B1 | 3/2002 | Steinkraus | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,493,692 B1 | 12/2002 | Kobayashi et al. | |
| 6,493,705 B1 | 12/2002 | Kobayashi et al. | |
| 6,507,672 B1 | 1/2003 | Watkins et al. | |
| 6,523,022 B1 | 2/2003 | Hobbs | |
| 6,523,046 B2 | 2/2003 | Liu et al. | |
| 6,524,861 B1 | 2/2003 | Anderson | |
| 6,526,400 B1 | 2/2003 | Takata et al. | |
| 6,550,018 B1 | 4/2003 | Abonamah et al. | |
| 6,557,042 B1 | 4/2003 | He et al. | |
| 6,560,597 B1 | 5/2003 | Dhillon et al. | |
| 6,594,699 B1 | 7/2003 | Sahai et al. | |
| 6,601,026 B2 | 7/2003 | Appelt et al. | |
| 6,601,060 B1 | 7/2003 | Tomaru | |
| 6,611,628 B1 | 8/2003 | Sekiguchi et al. | |
| 6,611,837 B2 | 8/2003 | Schreiber | |
| 6,618,711 B1 | 9/2003 | Ananth | |
| 6,640,015 B1 | 10/2003 | Lafruit | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,675,159 B1 | 1/2004 | Lin et al. | |
| 6,681,032 B2 | 1/2004 | Bortolussi et al. | |
| 6,704,725 B1 | 3/2004 | Lee | |
| 6,728,706 B2 | 4/2004 | Aggarwal et al. | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,836,776 B2 | 12/2004 | Schreiber | |
| 6,845,374 B1 | 1/2005 | Oliver et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,961,463 B1 * | 11/2005 | Loui | G06T 7/20 382/170 |
| 6,963,975 B1 | 11/2005 | Weare | |
| 6,970,881 B1 | 11/2005 | Mohan et al. | |
| 6,978,264 B2 | 12/2005 | Chandrasekar et al. | |
| 6,985,172 B1 | 1/2006 | Rigney et al. | |
| 7,006,689 B2 | 2/2006 | Kasutani | |
| 7,013,051 B2 | 3/2006 | Sekiguchi et al. | |
| 7,020,654 B1 | 3/2006 | Najmi | |
| 7,023,979 B1 | 4/2006 | Wu et al. | |
| 7,043,473 B1 | 5/2006 | Rassool et al. | |
| 7,124,149 B2 | 10/2006 | Smith et al. | |
| 7,158,681 B2 | 1/2007 | Persiantsev | |
| 7,199,798 B1 | 4/2007 | Echigo et al. | |
| 7,215,828 B2 | 5/2007 | Luo | |
| 7,260,564 B1 | 8/2007 | Lynn et al. | |
| 7,277,928 B2 | 10/2007 | Lennon | |
| 7,296,012 B2 | 11/2007 | Ohashi | |
| 7,299,261 B1 | 11/2007 | Oliver et al. | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,346,629 B2 | 3/2008 | Kapur et al. | |
| 7,353,224 B2 | 4/2008 | Chen et al. | |
| 7,376,672 B2 | 5/2008 | Weare | |
| 7,392,238 B1 | 6/2008 | Zhou et al. | |
| 7,406,459 B2 | 7/2008 | Chen et al. | |
| 7,433,895 B2 | 10/2008 | Li et al. | |
| 7,450,740 B2 | 11/2008 | Shah et al. | |
| 7,464,086 B2 | 12/2008 | Black et al. | |
| 7,523,102 B2 | 4/2009 | Bjarnestam et al. | |
| 7,526,607 B1 | 4/2009 | Singh et al. | |
| 7,529,659 B2 | 5/2009 | Wold | |
| 7,536,384 B2 | 5/2009 | Venkataraman et al. | |
| 7,542,969 B1 | 6/2009 | Rappaport et al. | |
| 7,548,910 B1 | 6/2009 | Chu et al. | |
| 7,555,477 B2 | 6/2009 | Bayley et al. | |
| 7,555,478 B2 | 6/2009 | Bayley et al. | |
| 7,562,076 B2 | 7/2009 | Kapur | |
| 7,574,436 B2 | 8/2009 | Kapur et al. | |
| 7,574,668 B2 | 8/2009 | Nunez et al. | |
| 7,577,656 B2 | 8/2009 | Kawai et al. | |
| 7,657,100 B2 | 2/2010 | Gokturk et al. | |
| 7,660,468 B2 | 2/2010 | Gokturk et al. | |
| 7,694,318 B2 | 4/2010 | Eldering et al. | |
| 7,801,893 B2 | 9/2010 | Gulli | |
| 7,836,054 B2 | 11/2010 | Kawai et al. | |
| 7,920,894 B2 | 4/2011 | Wyler | |
| 7,921,107 B2 | 4/2011 | Chang et al. | |
| 7,933,407 B2 | 4/2011 | Keidar et al. | |
| 7,974,994 B2 | 7/2011 | Li et al. | |
| 7,987,194 B1 | 7/2011 | Walker et al. | |
| 7,987,217 B2 | 7/2011 | Long et al. | |
| 7,991,715 B2 | 8/2011 | Schiff et al. | |
| 8,000,655 B2 | 8/2011 | Wang et al. | |
| 8,023,739 B2 | 9/2011 | Hohimer et al. | |
| 8,036,893 B2 | 10/2011 | Reich | |
| 8,098,934 B2 | 1/2012 | Vincent et al. | |
| 8,112,376 B2 | 2/2012 | Raichelgauz et al. | |
| 8,266,185 B2 | 9/2012 | Raichelgauz et al. | |
| 8,275,764 B2 | 9/2012 | Jeon | |
| 8,312,031 B2 | 11/2012 | Raichelgauz et al. | |

(56) References Cited

U.S. PATENT DOCUMENTS

| | | |
|---|---|---|
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| RE44,225 E | 5/2013 | Aviv |
| 8,457,827 B1 | 6/2013 | Ferguson et al. |
| 8,495,489 B1 | 7/2013 | Everingham |
| 8,527,978 B1 | 9/2013 | Sallam |
| 8,548,828 B1 | 10/2013 | Longmire |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,923,551 B1 * | 12/2014 | Grosz ............... H04N 1/00196 382/100 |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,298,763 B1 | 3/2016 | Zack |
| 9,323,754 B2 | 4/2016 | Ramanathan et al. |
| 9,330,189 B2 | 5/2016 | Raichelgauz et al. |
| 9,392,324 B1 * | 7/2016 | Maltar ............. H04N 21/47214 |
| 9,438,270 B2 | 9/2016 | Raichelgauz et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,157,291 B1 | 12/2018 | Kenthapadi et al. |
| 10,347,122 B2 | 7/2019 | Takenaka |
| 10,491,885 B1 | 11/2019 | Hicks |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0099870 A1 | 7/2002 | Miller et al. |
| 2002/0103813 A1 | 8/2002 | Frigon |
| 2002/0107827 A1 | 8/2002 | Benitez-Jimenez et al. |
| 2002/0113812 A1 | 8/2002 | Walker et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152087 A1 | 10/2002 | Gonzalez |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2002/0184505 A1 | 12/2002 | Mihcak et al. |
| 2003/0005432 A1 | 1/2003 | Ellis et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0047461 A1 | 3/2004 | Weisman |
| 2004/0059736 A1 | 3/2004 | Willse |
| 2004/0068510 A1 | 4/2004 | Hayes et al. |
| 2004/0091111 A1 | 5/2004 | Levy |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0119848 A1 | 6/2004 | Buehler |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0193093 A1 | 9/2005 | Mathew et al. |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |

(56) References Cited

U.S. PATENT DOCUMENTS

| | | |
|---|---|---|
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0082672 A1* | 4/2006 | Peleg ............. H04N 5/23232 348/333.01 |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0163288 A1 | 7/2008 | Ghosal et al. |
| 2008/0165861 A1 | 7/2008 | Wen et al. |
| 2008/0166020 A1 | 7/2008 | Kosaka |
| 2008/0172615 A1 | 7/2008 | Igelman et al. |
| 2008/0189609 A1* | 8/2008 | Larson ................. G06F 40/103 715/273 |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037408 A1 | 2/2009 | Rodgers |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0208106 A1 | 8/2009 | Dunlop et al. |
| 2009/0208118 A1* | 8/2009 | Csurka ............... G06K 9/00664 382/228 |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0198626 A1 | 8/2010 | Cho et al. |
| 2010/0212015 A1 | 8/2010 | Jin et al. |
| 2010/0268524 A1 | 10/2010 | Nath et al. |
| 2010/0284604 A1 | 11/2010 | Chrysanthakopoulos |
| 2010/0306193 A1 | 12/2010 | Pereira |
| 2010/0312736 A1 | 12/2010 | Kello |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0038545 A1 | 2/2011 | Bober |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0208744 A1* | 8/2011 | Chandiramani ...... G06F 16/738 707/741 |
| 2011/0218946 A1 | 9/2011 | Stern et al. |
| 2011/0246566 A1 | 10/2011 | Kashef |
| 2011/0251896 A1 | 10/2011 | Impollonia et al. |

(56) References Cited

U.S. PATENT DOCUMENTS

| | | |
|---|---|---|
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0041969 A1 | 2/2012 | Priyadarshan et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0197857 A1 | 8/2012 | Huang et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0294514 A1* | 11/2012 | Saunders ............ G06K 9/00677 382/159 |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0104251 A1 | 4/2013 | Moore et al. |
| 2013/0137464 A1* | 5/2013 | Kramer .............. G06Q 30/0261 455/456.3 |
| 2013/0159298 A1 | 6/2013 | Mason et al. |
| 2013/0173635 A1 | 7/2013 | Sanjeev |
| 2013/0212493 A1 | 8/2013 | Krishnamurthy |
| 2013/0226820 A1 | 8/2013 | Sedota, Jr. |
| 2013/0226930 A1 | 8/2013 | Arngren et al. |
| 2013/0273968 A1* | 10/2013 | Rhoads .................. H04W 4/50 455/556.1 |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0198986 A1* | 7/2014 | Marchesotti ....... G06K 9/00684 382/190 |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0317480 A1* | 10/2014 | Chau .................... G11B 27/036 715/202 |
| 2014/0330830 A1 | 11/2014 | Raichelgauz et al. |
| 2014/0341476 A1 | 11/2014 | Kulick et al. |
| 2014/0379477 A1 | 12/2014 | Sheinfeld |
| 2015/0033150 A1 | 1/2015 | Lee |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0134688 A1 | 5/2015 | Jing |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0210525 A1 | 7/2016 | Yang |
| 2016/0221592 A1 | 8/2016 | Puttagunta |
| 2016/0283483 A1* | 9/2016 | Jiang ..................... G06F 16/248 |
| 2016/0306798 A1 | 10/2016 | Guo et al. |
| 2016/0342683 A1 | 11/2016 | Lim et al. |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | | |
|---|---|---|---|
| WO | 0231764 | A2 | 4/2002 |
| WO | 2003005242 | A1 | 1/2003 |
| WO | 2003067467 | A1 | 8/2003 |
| WO | 2004019527 | A1 | 3/2004 |
| WO | 2005027457 | A1 | 3/2005 |
| WO | 2007049282 | A2 | 5/2007 |
| WO | WO2007049282 | | 5/2007 |
| WO | 2014076002 | A1 | 5/2014 |
| WO | 2014137337 | A1 | 9/2014 |
| WO | 2016040376 | A1 | 3/2016 |
| WO | 2016070193 | A1 | 5/2016 |
| WO | WO-2016127478 | A1 * | 8/2016 ............... G06T 7/00 |

OTHER PUBLICATIONS

Brecheisen, et al., "Hierarchical Genre Classification for Large Music Collections", ICME 2006, pp. 1385-1388.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.

McNamara, et al., "Diversity Decay in Opportunistic Content Sharing Systems", 2011 IEEE International Symposium on a World

(56) References Cited

OTHER PUBLICATIONS of Wireless, Mobile and Multimedia Networks Year: 2011, pp. 1-3, DOI: 10.1109/WoWMoM.2011.5986211 IEEE Conference Publications.

Odinaev, et al., "Cliques in Neural Ensembles as Perception Carriers", Technion—Israel Institute of Technology, 2006 International Joint Conference on Neural Networks, Canada, 2006, pp. 285-292.

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.

Wilk, et al.,"The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Zeevi, Y. et al.: "Natural Signal Classification by Neural Cliques and Phase-Locked Attractors", IEEE World Congress an Computational Intelligence, IJCNN2006, Vancouver, Canada, Jul. 2006 (Jul. 2006), XP002466252.

Boari et al, "Adaptive Routing for Dynamic Applications in Massively Parallel Architectures", 1995 IEEE, Spring 1995.

Cernansky et al., "Feed-forward Echo State Networks"; Proceedings of International Joint Conference on Neural Networks, Montreal, Canada, Jul. 31-Aug. 4, 2005; Entire Document.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al, "A Parallel Design and Implementation For Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Guo et al, "AdOn: An Intelligent Overlay Video Advertising System", SIGIR, Boston, Massachusetts, Jul. 19-23, 2009.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) Including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

International Search Report for the corresponding International Patent Application PCT/IL2006/001235; dated Nov. 2, 2008.

IPO Examination Report under Section 18(3) for corresponding UK application No. GB1001219.3, dated Sep. 12, 2011.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Jianping Fan et al., "Concept-Oriented Indexing of Video Databases: Towards Semantic Sensitive Retrieval and Browsing", IEEE, vol. 13, No. 7, Jul. 2004, pp. 1-19.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

May et al., "The Transputer", Springer-Verlag, Berlin Heidelberg, 1989, teaches multiprocessing system.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Nam, et al., "Audio Visual Content-Based Violent Scene Characterization", Department of Electrical and Computer Engineering, Minneapolis, MN, 1998, pp. 353-357.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

(56) References Cited

OTHER PUBLICATIONS

Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Shih-Fu Chang, et al., "VideoQ: A Fully Automated Video Retrieval System Using Motion Sketches", 1998, IEEE, , New York, pp. 1-2.
Theodoropoulos et al, "Simulating Asynchronous Architectures on Transputer Networks", Proceedings of the Fourth Euromicro Workshop On Parallel and Distributed Processing, 1996. PDP '96.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Hogue, "Tree Pattern Inference and Matching for Wrapper Induction on the World Wide Web", Master's Thesis, Massachusetts institute of Technology, 2004, pp. 1-106.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
McNamara et al., "Diversity Decay in opportunistic Content Sharing Systems", 2011 IEEE International Symposium an a World of Wireless, Mobile and Multimedia Networks, pp. 1-3.
Rui, Yong et al. "Relevance feedback: a power tool for interactive content-based image retrieval." IEEE Transactions an circuits and systems for video technology 8.5 (1998): 644-655.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society 2010; pp. 52-60. (Year: 2010).
Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance tor Images", Applied Optics, vol. 33, No. 26, 1994, pp. 6239-6253.

(56) References Cited

OTHER PUBLICATIONS

Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-Soc: A Multi-Core Soc Architecture for Multimedia Signal Processing" 2003).
Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Ma Et El. ("Semantics modeling based image retrieval system using neural networks" 2005 (Year: 2005).
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016)
Chen, Yixin, James Ze Wang, and Robert Krovetz. "Clue: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

SYSTEM AND METHOD FOR REMOVING CONTEXTUALLY IDENTICAL MULTIMEDIA CONTENT ELEMENTS

CROSS-REFERENCE TO RELATED APPLICATIONS

This application claims the benefit of U.S. Provisional Patent Application No. 62/310,742 filed on Mar. 20, 2016. This application is a continuation-in-part of U.S. patent application Ser. No. 14/643,694 filed on Mar. 10, 2015, now pending, which is a continuation of U.S. patent application Ser. No. 13/766,463 filed on Feb. 13, 2013, now U.S. Pat. No. 9,031,999. The Ser. No. 13/766,463 application is a continuation-in-part of U.S. patent application Ser. No. 13/602,858 filed on Sep. 4, 2012, now U.S. Pat. No. 8,868,619. The Ser. No. 13/602,858 application is a continuation of U.S. patent application Ser. No. 12/603,123 filed on Oct. 21, 2009, now U.S. Pat. No. 8,266,185. The Ser. No. 12/603,123 application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888 filed on Jan. 5, 2009, now pending, which is a continuation-in-part of the above-referenced U.S. patent application Ser. No. 12/084,150 and the above-referenced U.S. patent application Ser. No. 12/195,863; and (4) U.S. patent application Ser. No. 12/538,495 filed on Aug. 10, 2009, now U.S. Pat. No. 8,312,031, which is a continuation-in-part of the above-referenced U.S. patent application Ser. No. 12/084,150, the above-referenced U.S. patent application Ser. No. 12/195,863, and the above-referenced U.S. patent application Ser. No. 12/348,888.

All of the applications referenced above are hereby incorporated by reference.

TECHNICAL FIELD

The present disclosure relates generally to the analysis of multimedia content, and more specifically to identifying a plurality of multimedia content elements with respect to context.

BACKGROUND

With the abundance of data made available through various means in general and through the Internet and world-wide web (WWW) in particular, a need to understand likes and dislikes of users has become essential for on-line businesses.

Existing solutions provide various tools to identify user preferences. In particular, some of these existing solutions determine user preferences based on user inputs. These existing solutions actively require an input from the user that indicates the user's interests. However, profiles generated for users based on their inputs may be inaccurate, as the users tend to provide only their current interests, or only partial information due to their privacy concerns.

Other existing solutions passively track user activity through web sites such as social networks. The disadvantage with such solutions is that typically limited information regarding the users is revealed because users provide minimal information due to, e.g., privacy concerns. For example, users creating an account on Facebook® typically provide only the mandatory information required for the creation of the account.

Further, user inputs that may be utilized to determine user preferences may be duplicative. For example, a user may provide multiple images of his or her pet to illustrate that he or she has a user preference related to dogs. Such duplicative user inputs require additional memory usage, and may obfuscate the user's true interests. For example, if the user provides 10 images of his or her pet taken around the same time, the system receiving the images typically stores all 10 images, and any user preferences determined therefrom may appear to disproportionately revolve around pets.

It would therefore be advantageous to provide a solution that overcomes the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for removing contextually identical multimedia content elements. The method comprises analyzing a plurality of multimedia content elements to identify at least two multimedia content elements of the plurality of multimedia content elements that are contextually identical; selecting, from among the at least two contextually identical multimedia content elements, at least one optimal multimedia content element; and removing, from a storage, all multimedia content elements of the group of contextually identical multimedia content elements other than the at least one optimal multimedia content element.

Certain embodiments disclosed herein also include a non-transitory computer readable medium having stored thereon instructions for causing one or more processing units to execute a method, the method comprising: analyzing a plurality of multimedia content elements to identify at least two multimedia content elements of the plurality of multimedia content elements that are contextually identical; selecting, from among the at least two contextually identical multimedia content elements, at least one optimal multimedia content element; and removing, from a storage, all multimedia content elements of the group of contextually identical multimedia content elements other than the at least one optimal multimedia content element.

Certain embodiments disclosed herein also include system for removing contextually identical multimedia content elements. The system comprises: a processing circuitry; and a memory, the memory containing instructions that, when executed by the processing circuitry, configure the system to: analyze a plurality of multimedia content elements to identify at least two multimedia content elements of the plurality of multimedia content elements that are contextually identical; select, from among the at least two contextually identical multimedia content elements, at least one optimal multimedia content element; and remove, from a storage, all multimedia content elements of the group of contextually identical multimedia content elements other than the at least one optimal multimedia content element.

BRIEF DESCRIPTION OF THE DRAWINGS

The subject matter that is regarded disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
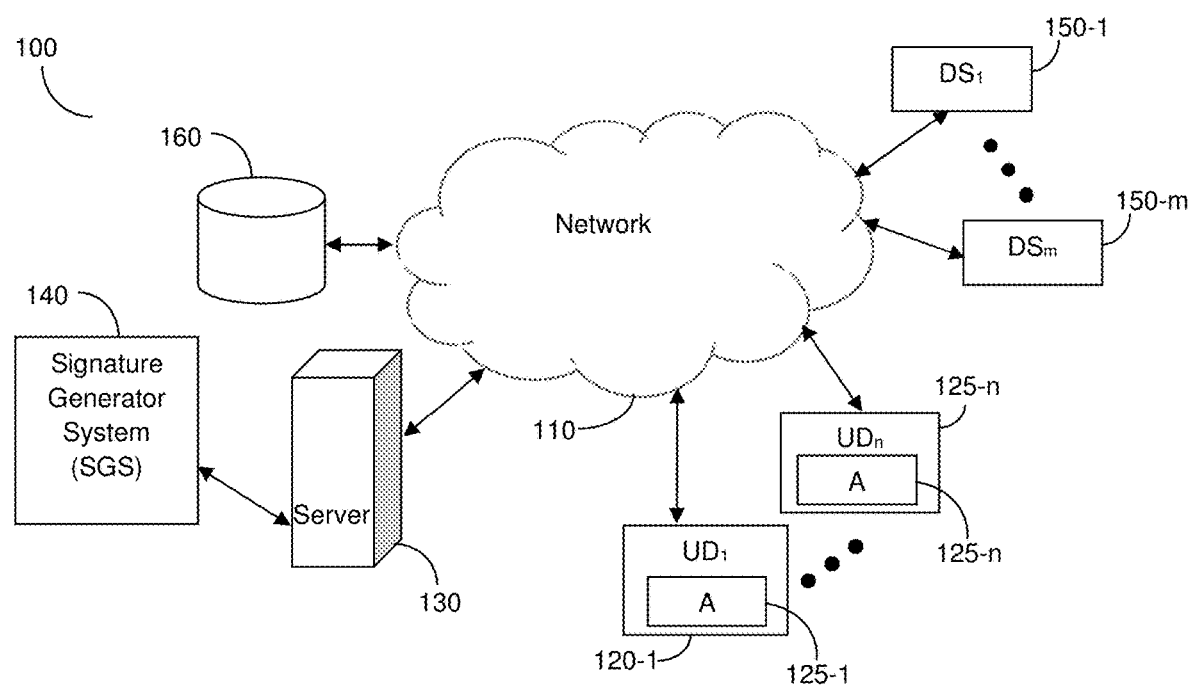
FIG. 1 is a network diagram utilized to describe the various embodiments disclosed herein.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a system and method for determining whether multimedia content elements are contextually identical. A plurality of multimedia content elements to identify contextually identical multimedia content elements. In an embodiment, the analysis includes generating at least one signature for each multimedia content element. In a further embodiment, the analysis includes matching among the generated signatures to identify signatures representing multimedia content elements that are contextually identical. In another embodiment, the analysis may include determining contextual identifiers for the plurality of multimedia content elements.

Contextually identical multimedia content elements are multimedia content elements associated with the same or nearly the same content. Contextually identical multimedia content elements may be determined to be contextually identical based on, e.g., features of the multimedia content elements (e.g., people and things captured in an image or video, sounds in audio or video, etc.), contextual insights related to the multimedia content elements (e.g., time of capture or receipt, location of capture, device which captured the multimedia content elements, etc.), and the like. For example, two images taken at a concert of a singer that were captured by two users standing next to each other may be contextually identical. As another example, two audio recordings of a song performed by the singer captured at different locations in the concert venue may be contextually identical.

Removing contextually identical multimedia content elements may be useful for, e.g., eliminating duplicative multimedia content elements or multimedia content elements that otherwise include essentially the same content. This elimination may reduce the amount of storage space needed and allows for removal of unnecessary duplicate multimedia content elements. For example, if a user accidentally presses the "capture" button on a camera multiple times when trying to take a picture of a group of friends, multiple images showing essentially the same scene will be captured. As another example, multiple people in a social media group may store multiple instances of the same video. In either example, a essentially duplicate identical multimedia content elements.

In an embodiment, upon identification of contextually identical multimedia content elements, a notification may be generated and sent. In another embodiment, at least one optimal multimedia content element may be determined from among the contextually identical multimedia content elements. The notification may also include a recommendation of the determined at least one optimal multimedia content element. The optimal multimedia content element may be determined based on, but not limited to, features of the multimedia content elements (e.g., resolution, focus, clarity, frame, texture, etc.); matching with other multimedia content elements (e.g., multimedia content elements ranked highly in a social network or liked by a particular user); a combination thereof; and the like. In some embodiments, multimedia content elements that are contextually identical to the optimal multimedia content element may be removed from, e.g., a storage.

As a non-limiting example, a user of a user device captures a series of 10 images determined as self-portrait photographs, which are typically referred to as "selfies", within a time span of a few minutes. The selfie images are analyzed. In this example, the images are analyzed by at least generating and matching signatures. Based on the analysis, it is determined that the 10 images are contextually identical. Upon determining that the 10 images are contextually identical, an optimal image from among the 10 images is determined and a recommendation of the optimal image is provided. Upon receiving a gesture from a user responsive to the recommendation, images of the contextually identical selfie images other than the optimal image are removed from the storage.

FIG. 1 shows an example network diagram 100 utilized to describe the various embodiments disclosed herein. As illustrated in FIG. 1, a network 110 is communicatively connected to a plurality of user devices (UDs) 120-1 through 120-n (hereinafter referred to individually as a user device 120 and collectively as user devices 120, merely for simplicity purposes), a server 130, a plurality of data sources (DSs) 150-1 through 150-m (hereinafter referred to individually as a data source 150 and collectively as data sources 150, merely for simplicity purposes), and a database 160. In an embodiment, the network 110 may also be communicatively connected to a signature generator system 140. The network 110 may be the Internet, the world-wide-web (WWW), a local area network (LAN), a wide area network (WAN), a metro area network (MAN), and other networks capable of enabling communication between the elements of the system 100.

The user device 120 may be, but is not limited to, a personal computer (PC), a personal digital assistant (PDA), a mobile phone, a tablet computer, a smart phone, a wearable computing device, and the like. Each user device 120 may have installed therein an agent 125-1 through 125-*n* (hereinafter referred to individually as an agent 125 and collectively as agents 125, merely for simplicity purposes), respectively. The agent 125 may be a dedicated application, script, or any program code stored in a memory (not shown) of the user device 120 and is executable, for example, by the operating system (not shown) of the user device 120. The agent 120 may be configured to perform some or all of the processes disclosed herein.

The user device 120 is configured to capture multimedia content elements, to receive multimedia content elements, to display multimedia content elements, or a combination thereof. The multimedia content elements displayed on the user device 120 may be, e.g., downloaded from one of the data sources 150, or may be embedded in a web-page displayed on the user device 120. Each of the data sources 150 may be, but is not limited to, a server (e.g., a web server), an application server, a data repository, a database, a website, an e-commerce website, a content website, and the like. The multimedia content elements can be locally saved in the user device 120 or can be captured by the user device 120.

For example, the multimedia content elements may include an image captured by a camera (not shown) installed in the user device 120, a video clip saved in the device, an image received by the user device 120, and so on. A multimedia content element may be, but is not limited to, an image, a graphic, a video stream, a video clip, an audio stream, an audio clip, a video frame, a photograph, an image of signals (e.g., spectrograms, phasograms, scalograms, etc.), a combination thereof, a portion thereof, and the like.

The various embodiments disclosed herein may be realized using the server 130, a signature generator system (SGS) 140, or both.

In an embodiment, a tracking agent such as, for example, the agent 125, may be configured to collect and send a plurality of multimedia content elements captured or displayed by the user device 120 to the server 130. In an embodiment, the server 130 may be configured to receive the collected multimedia content elements and to analyze the received multimedia content elements to determine whether and which of the multimedia content elements are contextually identical. The analysis may be based on, but is not limited to, signatures generated for each multimedia content element, concepts determined based on the multimedia content elements, contextual insights for each multimedia content element, a combination thereof, and the like.

In an embodiment, the server 130 is configured to pre-process the multimedia content elements to determine similarities between multimedia content elements of the plurality of multimedia content elements, and only multimedia content elements having similarities above a predetermined threshold are analyzed to determine contextually identical multimedia content elements. In an embodiment, the pre-processing may include analyzing factors including any of the signatures generated for each multimedia content element, the concepts determined based on the multimedia content elements, and the contextual insights for each multimedia content element before analyzing the other factors.

For example, it may first be checked if the multimedia content elements were captured within a time period below a predetermined threshold and, if not, the multimedia content elements may be determined not to be contextually identical without generating signatures or determining concepts.

In an embodiment, the server 130 may be configured to send the received multimedia content elements to the signature generator system 140. In an embodiment, the signature generator system 140 is configured to generate at least one signature for each of the multimedia content elements. The process for generating the signatures is explained in more detail herein below with respect to FIGS. 5 and 6. The generated signatures may be robust to noise and distortions as discussed further herein below.

In a further embodiment, the server 130 is further configured to receive the generated signatures from the signature generator system 140. In another embodiment, the server 130 may be configured to generate the at least one signature for each multimedia content element or portion thereof as discussed further herein below.

In an embodiment, whether multimedia content elements are contextually identical may be based on matching between signatures of the multimedia content elements. In a further embodiment, if the matching between the signatures is above a predetermined threshold, the signatures may be determined to be contextually identical.

It should be appreciated that signatures may be used for profiling the user's interests, because signatures allow more accurate recognition of multimedia content elements in comparison to, for example, utilization of metadata. The signatures generated by the signature generator system 140 for the multimedia content elements allow for recognition and classification of multimedia elements such as content-tracking, video filtering, multimedia taxonomy generation, video fingerprinting, speech-to-text, audio classification, element recognition, video/image search, and any other application requiring content-based signatures generation and matching for large content volumes such as web and other large-scale databases. For example, a signature generated by the signature generator system 140 for a picture showing a car enables accurate recognition of the model of the car from any angle at which the picture was taken.

In yet a further embodiment, the server 130 may be configured to match the generated signatures against a database of concepts (not shown) to identify a concept that can be associated with each signature, and hence the corresponding multimedia element.

A concept is a collection of signatures representing at least one multimedia content element and metadata describing the concept. The collection of signatures is a signature reduced cluster generated by inter-matching signatures generated for the at least one multimedia content element represented by the concept. The concept is represented using at least one signature. Generating concepts by inter-matching signatures is described further in U.S. patent application Ser. No. 14/096,901, filed on Dec. 4, 2013, assigned to the common assignee, which is hereby incorporated by reference.

In a further embodiment, matching the generated signatures against the database of concepts further includes matching the generated signatures to signatures representing the concepts. The signatures representing the concepts may be, but are not limited to, signatures included in the concepts or signature clusters representing the concepts.

In an embodiment, whether multimedia content elements are contextually identical may be based at least in part on whether the multimedia content elements are associated with the same or similar concepts. In a further embodiment, determining whether multimedia content elements are associated with the same or similar concepts may be utilized to preprocess and determine multimedia content elements that are not likely contextually identical. That is, in an embodiment, if two or more multimedia content elements are not associated with a similar concept, other factors for determining whether they are contextually identical (e.g., matching between signatures of the multimedia content elements or determination of contextual identifiers) may not be performed. As an example, if a first image is associated with concepts of "books" and "library" while a second image is associated with concepts of "flowers" and "sidewalk", the first image and the second image may be determined to not be contextually identical without requiring matching between signatures of the first and second images or consideration of time and location of capture of the images.

In another embodiment, the server 130 is further configured to generate at least one contextual insight of the received multimedia content elements. Contextual insights are conclusions related to the context of each multimedia content element, in particular relative to other contexts. In a further embodiment, the contextual insights may be based on metadata associated with each multimedia content element. To this end, in an embodiment, the server 130 is configured to parse the multimedia content elements to determine metadata associated with each multimedia content element.

The metadata may include, but is not limited to, a time pointer associated with a capture or display of a multimedia content element, a location pointer associated with a capture of a multimedia content element, details related to a device (e.g., the user device 120) that captured the multimedia content element, combinations thereof, and the like. In an embodiment, multimedia content elements may be contextually identical if the multimedia content elements were captured or displayed by the same user device 120, at the same (or roughly the same time), at the same (or roughly the same) location, or a combination thereof. Multimedia content elements may be captured or displayed at roughly the same time or location if a difference in the time or location between captures or displays is below a predetermined threshold. For example, if 15 images were captured within a time period of 30 seconds, the 15 images may be determined to be contextually identical. As another example, if two images were captured within 15 feet of each other, the two images may be determined to be contextually identical.

Based on the analysis, the server 130 is configured to determine whether at least two of the received multimedia content elements are contextually identical. As noted above, multimedia content elements may be contextually identical if, for example, signatures of the multimedia content elements match above a predetermined threshold; the multimedia content elements are associated with the same or similar concepts; contextual insights of the multimedia content elements indicate that the multimedia content elements were captured, displayed, or received at the same or similar time; the contextual insights indicate that the multimedia content elements were captured at the same or similar location; the contextual insights indicate that the multimedia content elements were captured by the same device; or a combination thereof.

In an embodiment, when it is determined that at least two multimedia contents are contextually identical, the server 130 is configured to send a notification indicating the at least two contextually identical multimedia content elements. In a further embodiment, the server 130 may be configured to receive a selection of one of the at least two contextually identical multimedia content elements. In yet a further embodiment, the server 130 is configured to remove, from a storage (e.g., one of the data sources 160), multimedia content elements of the at least two multimedia content elements other than the selected multimedia content element. Removing unselected contextually identical multimedia content elements reduces In a further embodiment, the server 130 may be configured to determine at least one optimal multimedia content element from among the at least two contextually identical multimedia content elements. The at least one optimal multimedia content element is a multimedia content element selected to represent the at least two contextually identical multimedia content elements. The at least one optimal multimedia content element may be determined based on, but not limited to, features of the multimedia content elements (e.g., resolution, focus, clarity, frame, texture, etc.); matching with other multimedia content elements (e.g., multimedia content elements ranked highly in a social network or liked by a particular user); a combination thereof; and the like.

In a further embodiment, the server 130 is configured to determine the optimal multimedia content based on, but not limited to, matching between signatures representing the at least two contextually identical multimedia content elements and signatures representing concepts a particular user is interested in. In yet a further embodiment, the contextually identical multimedia content element having the signature with the highest matching to the user interest concept signatures may be determined as the optimal multimedia content element.

To this end, each concept may be associated with at least one user interest. For example, a concept of flowers may be associated with a user interest in 'flowers' or 'gardening.' In an embodiment, the user interest may simply be the identified concept. In another embodiment, the user interest may be determined using an association table which associates one or more identified concepts with a user interest. For example, the concepts of 'flowers' and 'spring' may be associated, in an association table with a user interest of 'gardening'. Such an association table may be maintained in, e.g., the server 130 or the database 160.

In an embodiment, the notification may further indicate the at least one optimal multimedia content element. In a further embodiment, the notification including the at least one optimal multimedia content element is then provided to the user device 120 and the user device 120 is prompted to confirm selection of the at least one optimal multimedia content element. When the selection is confirmed, the server 130 is configured to remove the multimedia content element(s) of the at least two contextually identical multimedia content elements which were not determined as optimal from, e.g., a storage. In an embodiment, the server 130 is configured to remove the non-optimal multimedia content elements in real-time. In another embodiment, the server 130 may be configured to automatically remove the non-optimal multimedia content elements when at least one optimal multimedia content element is determined.

Each of the server 130 and the signature generator system 140 typically includes a processing circuitry (not shown) that is coupled to a memory (not shown). The memory typically contains instructions that can be executed by the processing circuitry. The server 130 also includes an interface (not shown) to the network 110. In an embodiment, the signature generator system 140 can be integrated in the server 130. In an embodiment, the server 130, the signature generator system 140, or both may include a plurality of computational cores having properties that are at least partly statistically independent from other of the plurality of computational cores. The computational cores are discussed further herein below.

Figure 2:
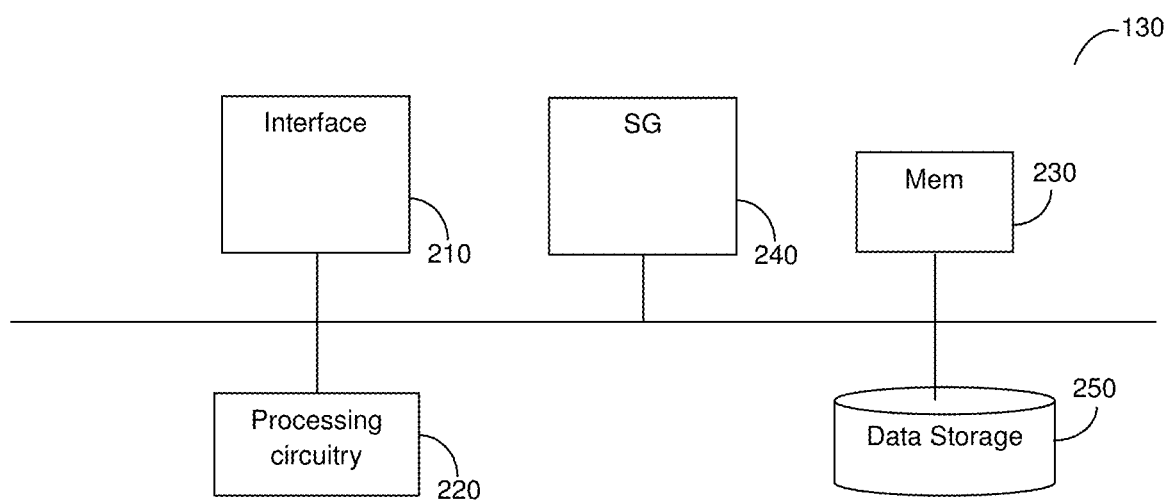
FIG. 2 is a schematic diagram of a system for removing contextually identical multimedia content elements according to an embodiment.

FIG. 2 is an example schematic diagram of a system for removing contextually identical multimedia content elements according to an embodiment. In the example schematic diagram shown in FIG. 2, the system is the server 130. It should be noted that, in another embodiment, the system may be the user device 120. In a further embodiment, the agent 125 installed on the user device 120 may be configured to identify contextually identical multimedia content elements as described herein.

The server 130 includes an interface 210 at least for receiving multimedia content elements captured or displayed by the user device 120 and for sending notifications indicating contextually identical multimedia content elements, optimal multimedia content elements, or both, to the user device 120. The server 130 further includes a processing circuitry 220 such as a processor coupled to a memory (mem) 230. The memory 230 contains instructions that, when executed by the processing circuitry 220, configures the server 130 to identify contextually identical multimedia content elements as further described herein.

In an embodiment, the server 130 also includes a signature generator (SG) 240. The signature generator 240 includes a plurality of computational cores having properties that are at least partly statistically independent from other of the plurality of computational cores. The signature generator 240 is configured to generate signatures for multimedia content elements. In an embodiment, the signatures are robust to noise, distortion, or both. In another embodiment, the server 130 may be configured to send, to an external signature generator (e.g., the signature generator system 140), one or more multimedia content elements and to receive, from the external signature generator, signatures generated to the sent one or more multimedia content elements.

In another embodiment, the server 130 includes a data storage 250. The data storage may store, for example, signatures of multimedia content elements, signatures of concepts, contextually identical multimedia content elements, optimal multimedia content elements, combinations thereof, and the like.

Figure 3:
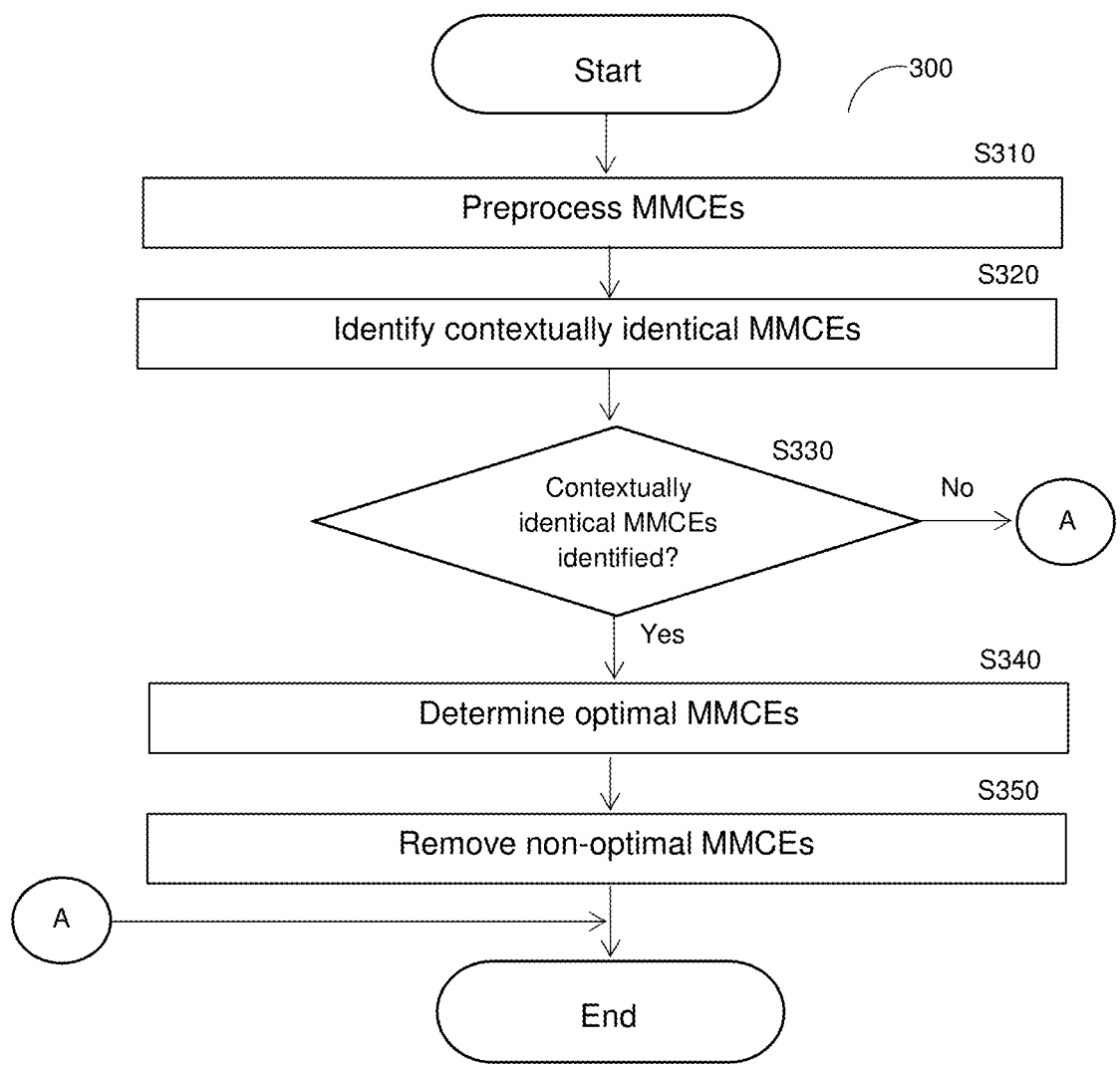
FIG. 3 is flowchart illustrating a method for identifying contextually identical multimedia content elements according to an embodiment.

FIG. 3 is an example flowchart 300 illustrating a method for identifying and removing contextually identical multimedia content elements (MMCEs) according to an embodiment. In an embodiment, the method may be performed by the server 130, the user device 120, or both. In an embodiment, the contextually identical multimedia content elements are identified based on a plurality of received multimedia content elements. The received multimedia content elements may be, e.g., multimedia content elements captured by a user device, multimedia content elements stored on a server (e.g., a server of a social network entity), and so on.

At optional S310, the plurality of multimedia content elements may be preprocessed. The preprocessing allows for, e.g., reduced usage of computing resources. To this end, in an embodiment, S310 includes, but is not limited to, determining at least one contextual insight (e.g., time, location, or device of capture or display) for each of the plurality of multimedia content elements, determining a concept associated with each of the plurality multimedia content elements, or both. Determining contextual insights and concepts for multimedia content elements are described further herein above with respect to FIG. 1. In a further embodiment, S310 further includes determining, based on the concepts, contextual insights, or both, whether any of the plurality of multimedia content elements are potentially contextually identical. In yet a further embodiment, S310 may include filtering out any of the multimedia content elements that are not determined to be potentially contextually identical.

At S320, the multimedia content elements are analyzed to identify at least one group of contextually identical multimedia content elements. Each group of contextually identical multimedia content elements includes at least two multimedia content elements that are contextually identical to each other. In an embodiment, the analysis may be based on, but not limited to, at least one contextual insight of each multimedia content element, at least one concept associated with each multimedia content element, at least one signature of each multimedia content element, or a combination thereof. Analyzing multimedia content elements to identify contextually identical multimedia content elements is described further herein below with respect to FIG. 4.

In another embodiment, S320 may include sending, to a signature generator system (e.g., the signature generator system 140) the multimedia content elements and receiving, from the signature generator system, at least one signature for each sent multimedia content element.

At S330, it is determined, based on the analysis, whether any multimedia content elements were identified as being contextually identical to each other. If so, execution continues with S340; otherwise, execution terminates.

At S340, at least one optimal multimedia content element may be determined from among the identified contextually identical multimedia content elements. In an embodiment, the at least one optimal multimedia content element may be determined based on, but not limited to, features of the multimedia content elements (e.g., resolution, focus, clarity, frame, texture, etc.); matching with other multimedia content elements (e.g., multimedia content elements ranked highly in a social network or liked by a particular user); a combination thereof; and the like.

In a further embodiment, one optimal multimedia content element may be selected for each group of contextually identical multimedia content elements that are contextually identical to each other. As an example, if the plurality of multimedia content elements includes 3 images showing a dog that are contextually identical and 5 videos showing a cat that are contextually identical, an optimal image may be selected from among the 3 contextually identical dog images and an optimal video may be selected from among the 5 contextually identical cat videos.

At S350, for each group of contextually identical multimedia content elements, all multimedia contents of the set other than the at least one optimal multimedia content are removed from, e.g., a storage. The removal may be automatic and in real-time. Alternatively, in another embodiment, S350 may include sending, to a user device, a notification indicating the selecting optimal multimedia content elements and prompting a user to confirm selection of the optimal multimedia content elements. In a further embodiment, upon receiving confirmation of the selection of the optimal multimedia content elements, S350 includes automatically removing all non-optimal multimedia content elements. In yet a further embodiment, S350 may further include receiving a selection of at least one alternative optimal multimedia content element. In such an embodiment, all multimedia content elements other than the at least one alternative optimal multimedia content may be removed from the storage.

As a non-limiting example, a plurality of images is received. The plurality of images is stored in a web server of a social network. The plurality of images includes 10 images showing a group of friends and one image showing an ocean. The plurality of images are preprocessed by determining contextual insights for each image. Each image is parsed to identify metadata, and the metadata is analyzed to determine the contextual insights. Based on the contextual insights, it is determined that the image showing the ocean was captured one hour after the images showing the group of friends, and that the images showing the group of friends were captured within 1 minute of each other. Accordingly, the images showing the group of friends are determined to be potentially contextually identical, and the image of the ocean is filtered out.

The remaining images showing the group of friends is analyzed by generating and matching signatures for each of the images. Based on the signature matching, it is determined that all of the images showing the group of friends match above a predetermined threshold. Thus, it is determined that the 10 images of the group of friends are contextually identical. Features of the contextually identical images are analyzed. Based on the feature analysis, it is determined that one of the contextually identical images has a higher resolution than other of the contextually identical images. The higher resolution image is selected as the optimal image, and the other images of the group of friends are removed from the web server.

Figure 4:
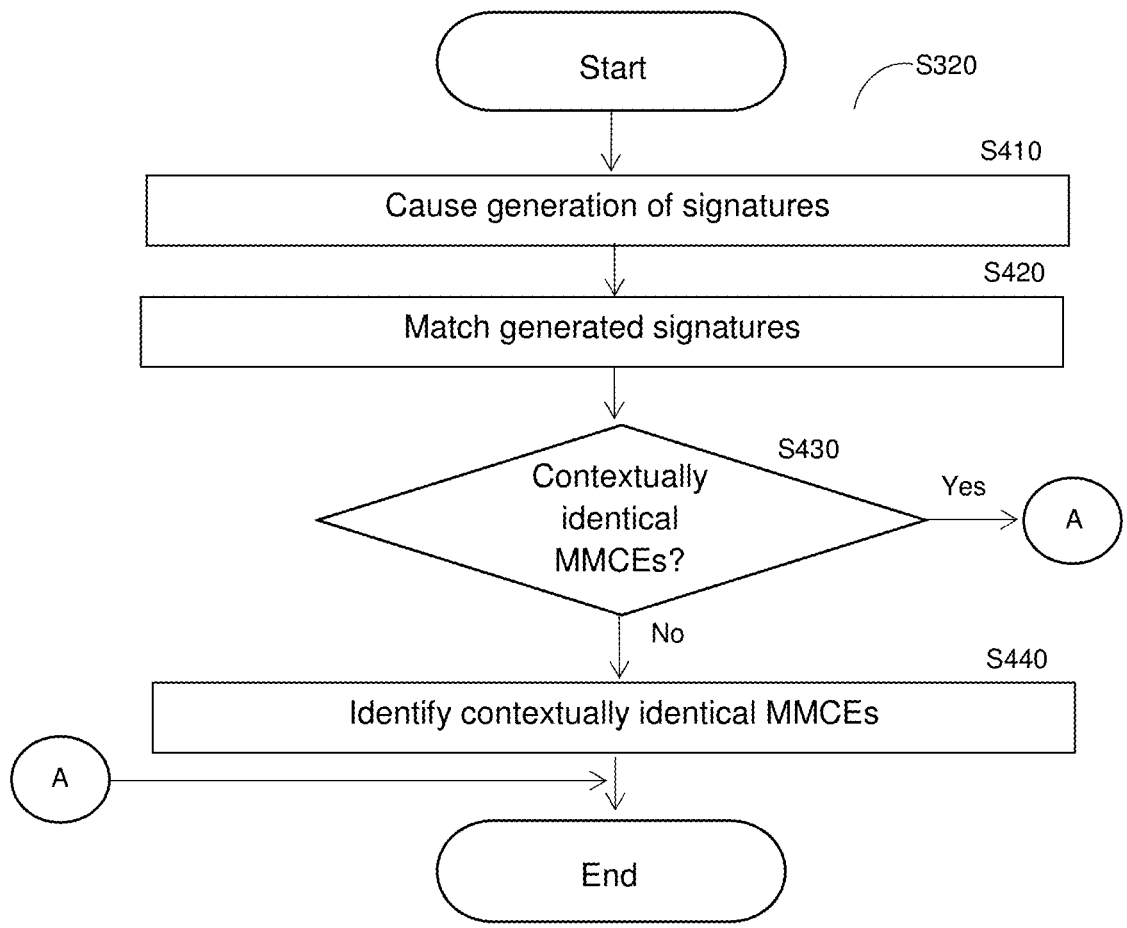
FIG. 4 is a flowchart illustrating a method for generating contextual insights according to an embodiment.

FIG. 4 is an example flowchart S320 illustrating a method for analyzing a plurality of multimedia content elements to identify contextually identical multimedia content elements according to an embodiment.

At S410, at least one signature for each multimedia element identified is caused to be generated. In an embodiment, S410 may further include sending, to a signature generator system, the plurality of multimedia content elements and receiving, from the signature generator system, signatures generated for the plurality of multimedia content elements. Generation of signatures is described further herein below with respect to FIGS. 5-6.

At S420, the generated signatures are matched. Matching between signatures is described further herein below with respect to FIG. 5.

At S430, it is determined, based on the signature matching, whether any of the plurality of multimedia content elements are contextually identical and, if so, execution continues with S440; otherwise, execution terminates. In an embodiment, S430 includes determining, based on the matching, whether signatures representing any of the plurality of multimedia content elements match above a predefined threshold, where two or more multimedia content elements are contextually identical to each other when signatures representing the two or more multimedia contents match above a predetermined threshold.

At S440, when it is determined that at least two of the multimedia content elements are contextually identical, at least one group of contextually identical multimedia content elements is identified. Each set includes at least two multimedia content elements that are contextually identical to each other.

Figure 5:
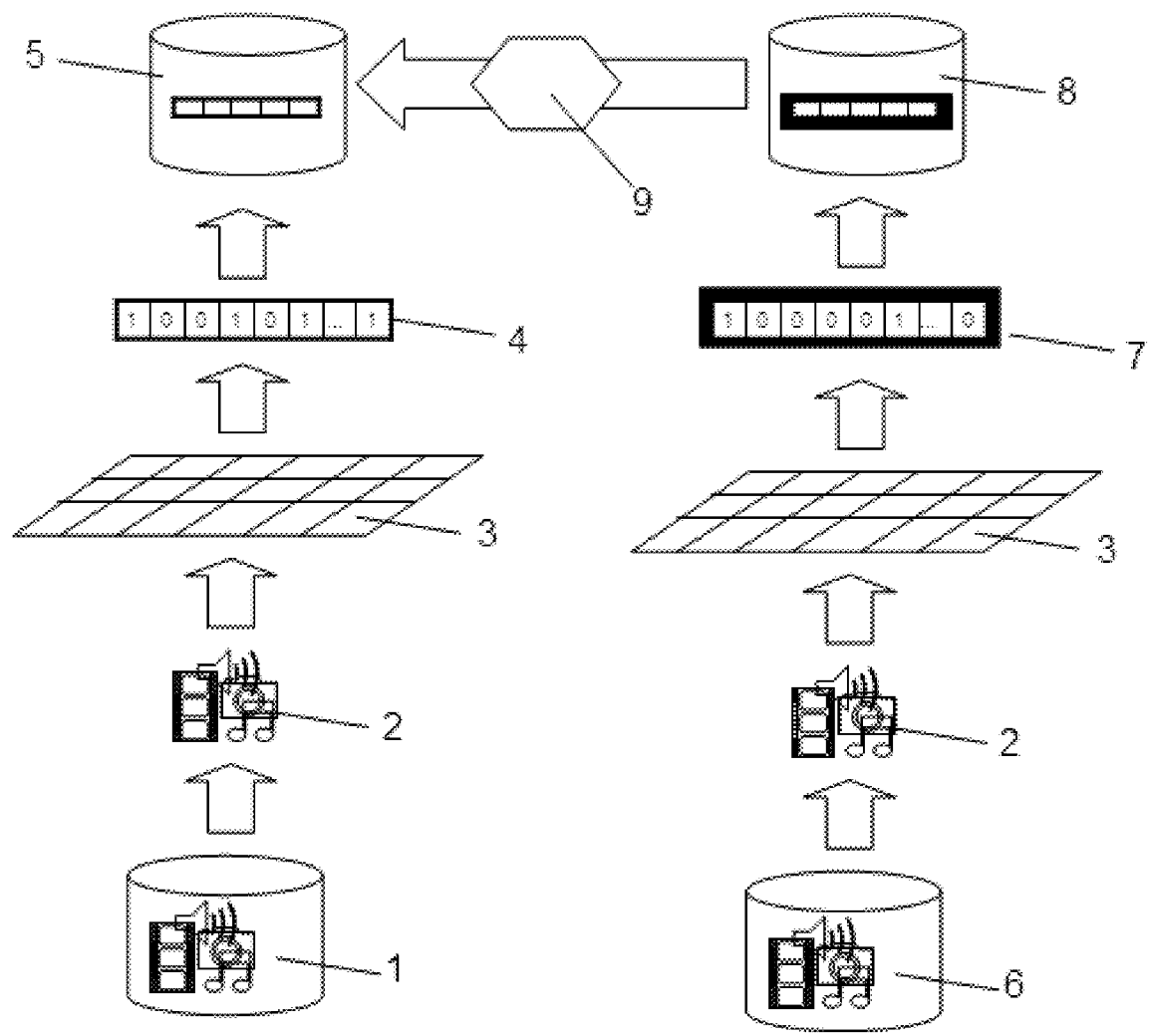
FIG. 5 is a block diagram depicting the basic flow of information in the signature generator system.
Figure 6:
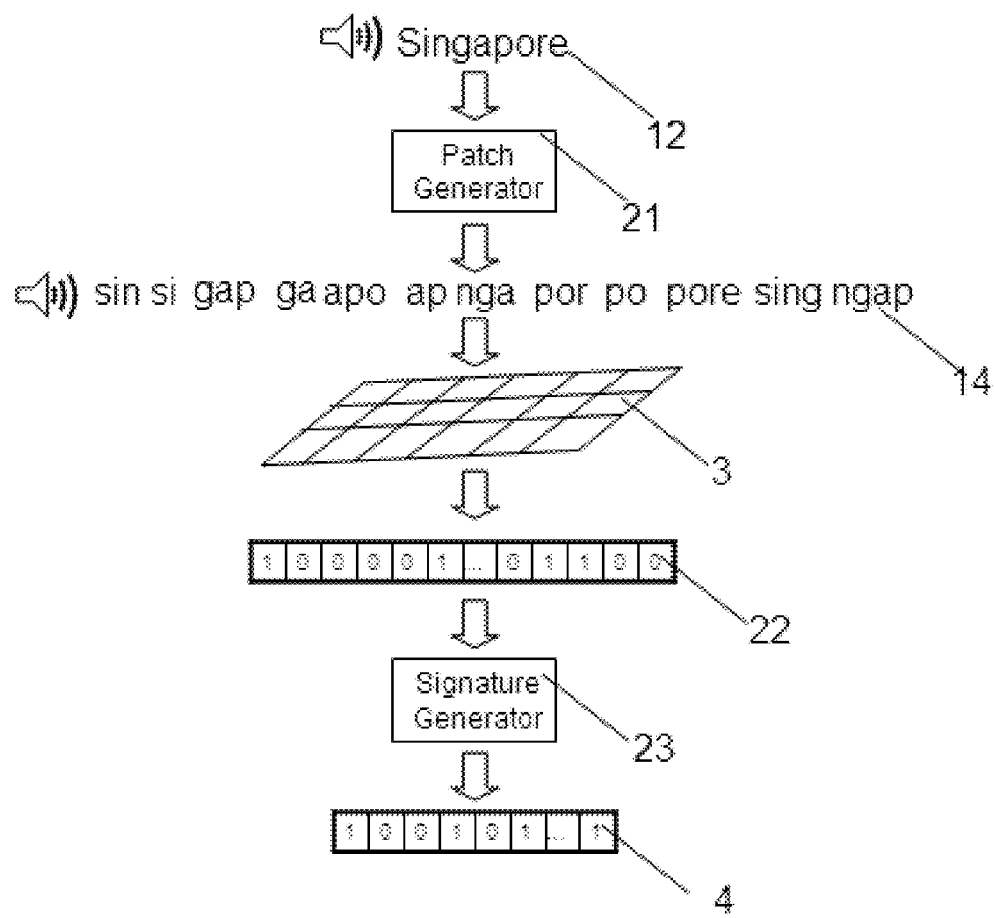
FIG. 6 is a diagram showing the flow of patches generation, response vector generation, and signature generation in a large-scale speech-to-text system.

FIGS. 5 and 6 illustrate the generation of signatures for the multimedia elements by the signature generator system 140 according to one embodiment. An exemplary high-level description of the process for large scale matching is depicted in FIG. 5. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 5. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SIGNATURE GENERATOR SYSTEM 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j \quad n_i = \theta(V_i - Th_x)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where x is 'S' for Signature and 'RS' for Robust Signature; and $V_i$ is a Coupling Node Value.

The Threshold values ThX are set differently for Signature generation and for Robust Signature generation. For example, for a certain distribution of values (for the set of nodes), the thresholds for Signature (ThS) and Robust Signature (ThRS) are set apart, after optimization, according to at least one or more of the following criteria:

1: For: $V_i > Th_{RS}$ $$1 - p(V > Th_S) - 1 - (1-\varepsilon)^l \ll 1$$

i.e., given that l nodes (cores) constitute a Robust Signature of a certain image I, the probability that not all of these l nodes will belong to the Signature of a same, but noisy image, Ĩ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, assigned to common assignee, and are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the U.S. Pat. No. 8,655,801 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for removing contextually identical multimedia content elements, comprising:

analyzing a plurality of multimedia content elements to identify at least two contextually identical multimedia content elements of the plurality of multimedia content elements, wherein the contextually identical multimedia content elements are contextually identical;

selecting, at least one of the at least two contextually identical multimedia content elements, to provide at least one selected multimedia content element; wherein the selecting is based on at least one out of (a) a texture of the at least two contextually identical multimedia content elements, (b) a combination of multiple features of the at least two contextually identical multimedia content elements; (c) a match between each one of the at least two contextually identical multimedia content elements and another multimedia content element that is a most popular multimedia element in a social network, or (d) a match between each one of the at least two contextually identical multimedia content elements and another multimedia content element liked by a particular user; and wherein when the at least two contextually identical multimedia content elements comprise, in addition to the at least one selected multimedia content element, one or more non-selected multimedia content elements, then automatically removing, from a storage, the one or more non-selected multimedia content elements;

wherein the analysis is based on at least one of: contextual insights of the plurality of multimedia content elements, and concepts associated with the plurality of multimedia content elements;

wherein analyzing the plurality of multimedia content elements further comprises:

causing generation of at least one signature for each of the plurality of multimedia content elements; and matching between signatures of the plurality of multimedia content elements, wherein the at least two contextually identical contextually identical multimedia content elements are identified based on the signature matching.

2. The method of claim 1, wherein the multiple features comprise resolution, focus and clarity.

3. The method of claim 1, wherein the multiple features comprise resolution and frame.

4. The method of claim 1, wherein at least two multimedia content elements are contextually identical when signatures of the at least two multimedia content elements match above a predetermined threshold.

5. The method of claim 1, comprising generating, by multiple computational cores of a signature generating system, each signature of the at least one signature for each of the plurality of multimedia content elements, wherein each computational core having properties that are at least partly statistically independent of other of the computational cores, wherein the properties of each computational core are set independently of each other core.

6. The method of claim 1, wherein the analyzing of the plurality of multimedia content elements further comprises: generating, based on metadata associated with each multimedia content element, at least one contextual insight, wherein the analysis is based on the generated at least one contextual insight.

7. The method of claim 1, wherein the analyzing of the plurality of multimedia content elements further comprises:
causing generation of at least one signature for each of the plurality of multimedia content elements;
determining, based on the generated signatures, at least one concept for each multimedia content element, wherein the analysis is based on the generated concepts, wherein each concept is a collection of signatures and metadata representing the concept.

8. The method according to claim 7 wherein at least one concept is a signature reduced concept that undergone a process of reducing at least one signature from the concept.

9. The method of claim 1, further comprising: preprocessing the plurality of multimedia content elements to identify a plurality of potentially contextually identical multimedia content elements, wherein the at least two contextually identical multimedia content elements are identified from among the plurality of potentially contextually identical multimedia content elements.

10. The method according to claim 1 wherein the at least two contextually identical multimedia content elements are images and wherein the selecting of the at least one selected multimedia content element is based on a focus of each one of the at least two contextually identical multimedia content elements and on the texture of the at least two contextually identical multimedia content elements.

11. The method according to claim 1 wherein the at least two contextually identical multimedia content elements are images; and wherein the selecting of the at least one selected multimedia content element is based on (i) the combination of the multiple features of the at least two contextually identical multimedia content elements, the multiple features comprise a resolution of the at least two contextually identical multimedia content elements; and is also based on (ii) the match between each one of the at least two contextually identical multimedia content elements and the other multimedia content element that is the most popular multimedia element in the social network.

12. The method according to claim 1 wherein the selecting of the at least one selected multimedia content element is based on (i) the combination of the multiple features of the at least two contextually identical multimedia content elements, the multiple features comprise the clarity of each one of the at least two contextually identical multimedia content elements.

13. The method according to claim 1 wherein the selecting of the at least one selected multimedia content element is based on the match between each one of the at least two contextually identical multimedia content elements and the other multimedia content elements that is the most popular multimedia content element in the social network.

14. The method according to claim 1 wherein the selecting of the at least one selected multimedia content element is based on the match between each one of the at least two contextually identical multimedia content elements and the other multimedia content element liked by the particular user.

15. The method according to claim 1 wherein the analyzing is based on timing difference between acquisitions of the plurality of multimedia content elements.

16. The method according to claim 1 wherein the analyzing is based on locations of acquisition of the plurality of multimedia content elements.

17. The method according to claim 1 wherein the analyzing is based on devices that acquired of the plurality of multimedia content elements.

18. A system for removing contextually identical multimedia content elements, comprising: a processing circuitry; and a memory, the memory containing instructions that, when executed by the processing circuitry, configure the system to:
analyze a plurality of multimedia content elements to identify at least two contextually identical multimedia content elements of the plurality of multimedia content elements, wherein the multimedia content elements of the plurality of multimedia content identical;
select, at least one of the at least two contextually identical multimedia content elements, to provide at least one selected multimedia content element; wherein the selecting is based on at least one out of (a) a texture of the at least two contextually identical multimedia content elements, (b) a combination of multiple features of the at least two contextually identical multimedia content elements; (c) a match between each one of the at least two contextually identical multimedia content elements and another multimedia content element that is a most popular multimedia element in a social network, or (d) a match between each one of the at least two contextually identical multimedia content elements and another multimedia content element liked by a articular user; and
wherein when the at least two contextually identical multimedia content elements comprise, in addition to the at least one selected multimedia content element, one or more non-selected multimedia content elements, then automatically remove, from a storage, the one or more non-selected multimedia content elements;
wherein the analysis is based on at least one of: contextual insights of the plurality of multimedia content elements, and concepts associated with the plurality of multimedia content elements;
wherein an analyzing the plurality of multimedia content elements further comprises:
cause generation of at least one signature for each of the plurality of multimedia content elements; and
match between signatures of the plurality of multimedia content elements, wherein the at least two contextually identical contextually identical multimedia content elements are identified based on the signature matching.

19. The system of claim 18, wherein the multiple features comprise resolution, focus and clarity.

20. The system of claim 18, wherein the multiple features comprise resolution and frame.

21. The system of claim 18, wherein at least two multimedia content elements are contextually identical when signatures of the at least two multimedia content elements match above a predetermined threshold.

22. The system of claim 18, wherein the comprising a signature generator that comprises a plurality of computational cores that are configured to generate each signature n of the at least one signature for each of the plurality of multimedia content elements, wherein each computational core having properties that are at least partly statistically independent of other of the computational cores, wherein the properties of each computational core are set independently of each other core.

23. The system of claim 18, wherein the system is further configured to:
generate, based on metadata associated with each multimedia content element, at least one contextual insight, wherein the analysis is based on the generated at least one contextual insight.

24. The system of claim 18, wherein the system is further configured to:
cause generation of at least one signature for each of the plurality of multimedia content elements;
determine, based on the generated signatures, at least one concept for each multimedia content element, wherein the analysis is based on the generated concepts, wherein each concept is a collection of signatures and metadata representing the concept.

25. The system of claim 18, wherein the system is further configured to: preprocess the plurality of multimedia content elements to identify a plurality of potentially contextually identical multimedia content elements, wherein the at least two contextually identical multimedia content elements are identified from among the plurality of potentially contextually identical multimedia content elements.

26. A non-transitory computer readable medium having stored thereon instructions for causing one or more processing units to execute a method, the method comprising:

analyzing a plurality of multimedia content elements to identify at least two contextually identical multimedia content elements of the plurality of multimedia content elements, wherein the contextually identical multimedia content elements are contextually identical;

selecting, at least one of the at least two contextually identical multimedia content elements, to provide at least one selected multimedia content element; wherein the selecting is based on at least one out of (a) a texture of the at least two contextually identical multimedia content elements, (b) a combination of multiple features of the at least two contextually identical multimedia content elements; (c) a match between each one of the at least two contextually identical multimedia content elements and another multimedia content element that is a most popular multimedia element in a social network, or (d) a match between each one of the at least two contextually identical multimedia content elements and another multimedia content element liked by a particular user; and wherein when the at least two contextually identical multimedia content elements comprise, in addition to the at least one selected multimedia content element, one or more non-selected multimedia content elements, then automatically removing, from a storage, the one or more non-selected multimedia content elements;

wherein the analysis is based on at least one of: contextual insights of the plurality of multimedia content elements, and concepts associated with the plurality of multimedia content elements;

wherein analyzing the plurality of multimedia content elements further comprises:

causing generation of at least one signature for each of the plurality of multimedia content elements; and matching between signatures of the plurality of multimedia content elements, wherein the at least two contextually identical contextually identical multimedia content elements are identified based on the signature matching.

* * * * *